UNITED STATES PATENT OFFICE.

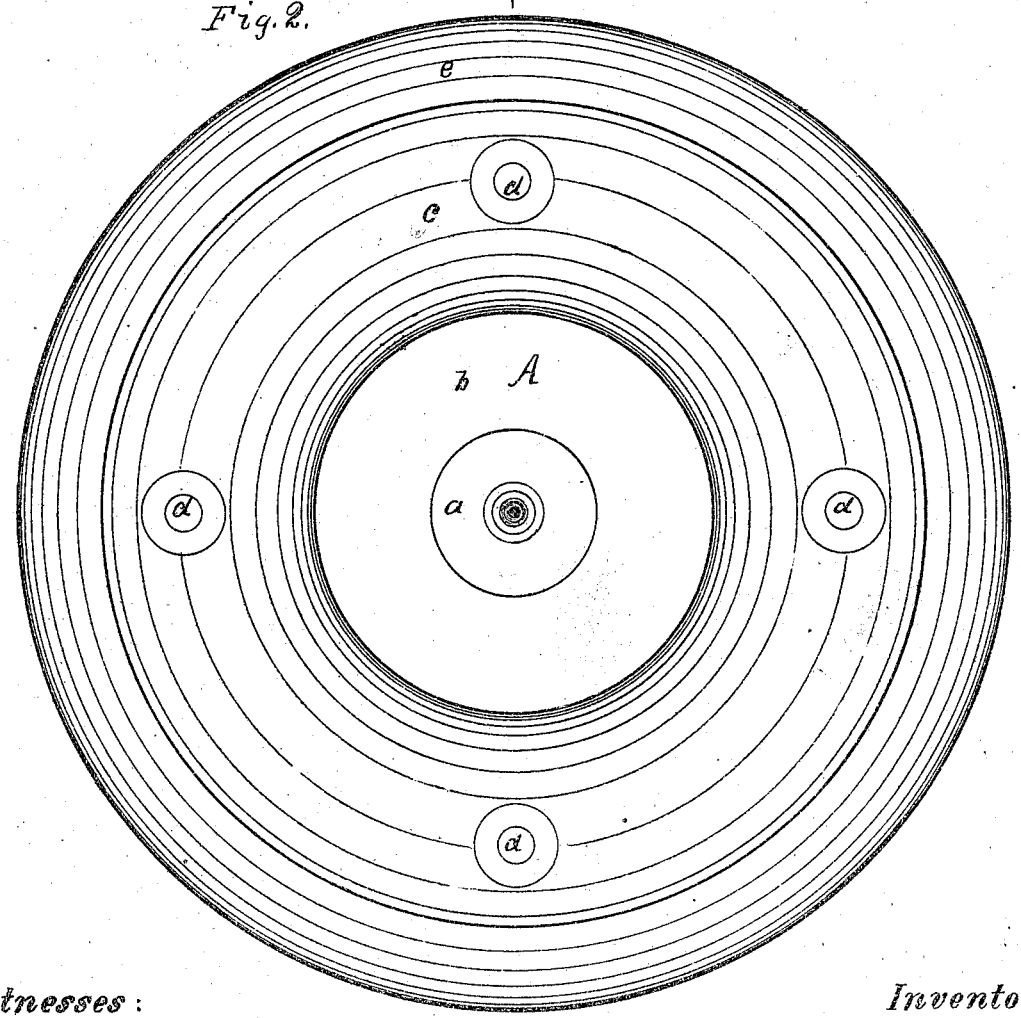

DENNIS B. STROPE, OF FORT WAYNE, INDIANA.

IMPROVEMENT IN CONES FOR LOCOMOTIVE SMOKE-STACKS.

Specification forming part of Letters Patent No. 120,835, dated November 14, 1871.

*To all whom it may concern:*

Be it known that I, DENNIS B. STROPE, of Fort Wayne, in the county of Allen and State of Indiana, have invented certain new and useful Improvements in Cones for Smoke-Stacks for Locomotives; and I do hereby declare that the following is a full and exact description thereof, reference being had to the accompanying drawing and to the letters of reference marked thereon, in which like letters refer to like parts in the different figures.

To enable others skilled in the arts to make and use my invention, I will proceed to describe its construction and operation.

In the drawing, Figure 1 is a vertical section. Fig. 2 is a plan view.

The nature of my invention consists in the arrangement and combination of a series of inverted cones or sections thereof with a circular concavo-convex plate having its center removed so as to form a ring, the whole, when completed, forming an inverted cone, to be secured in the ordinary position in the bonnet of a locomotive smoke-stack. Said sections are formed, proportioned, and arranged in relation to each other so as to form a surface which will effectually deflect the cinders and other solids in the ordinary manner, and at the same time freely admit of the escape of the steam and elastic gases of combustion through it and diffuse them equally upon the entire surface of the smoke-sieve, thus allowing them to pass freely and rapidly out without clogging any portion of said sieve, the effect of which is to greatly enhance the force of the draught—a result of the greatest practical importance.

A represents a cone which is composed of sectional parts, in which $a$ represents an inverted cone, which is secured by suitable means at its base to the lower extremity of the section of an inverted cone, $b$, as seen in Fig. 1. The cone $a$ at its base is of a greater diameter than that of cone $b$ at the point of attachment, and they are so positioned in relation to each other as to form a space between the surfaces of their transverse sections, as will be readily understood, thus forming an opening of considerable capacity, which extends around the entire circumference of the cone. These cones are of different diameters, in proportion to their respective heights; hence the line of the side of cone $a$ will intersect that of cone $b$. Cone $b$ in turn is in like manner and for a like purpose secured to the lower extremity of conically-formed section $c$. The sides of section $c$, instead of being straight, so as to form a true section of a cone, are curved outward, as seen in Fig. 1, and are provided with suitable devices, $d$, by which the cone may be secured in position. To the outer edge of this section, and by similar means and for the same purpose, a concavo-convex plate having its center removed is secured, thus completing a cone composed of several sections and having a deflecting-surface equal to that of a solid cone of the same dimensions; while, at the same time, it has three or more openings, each of which has the capacity to pass off a great portion of the steam and smoke.

The operation of my invention is as follows: A charge of exhaust-steam is forced upward through the stack, projecting with it cinders and smoke, which impinge on the under surfaces of the respective sections of the cone and are thence deflected from a vertical, as in the ordinary way, while the steam and elastic gases escape through the passages formed between the sections without in the least interfering with the deflection of the solid particles; or being forced downward so as to, in a measure, counteract the force of the next successive exhaust of steam; or supply from above the tendency to a vacuum which has just been created.

The advantages of this device will be more fully appreciated when we consider that at each successive exhaust the steam and smoke impinge vertically upon the ordinary cone, and are deflected thence outward and principally downward with great violence; and in their downward course a considerable portion thereof comes in immediate contact with the just-formed upward current of the draught and tends to strongly retard it. At the next exhaust it is forced again upward around the outer edges of the cone, and thence through the outer edge of the smoke-sieve, while the center thereof remains inoperative and soon becomes clogged. Thus it will be seen that some considerable portion of the force of each successive exhaust is expended by the downward force of the steam, while the force of the draught is proportionably abated; while in this apparatus that defect is, to a great extent, obviated.

What I claim as new, and desire to secure by Letters Patent, is—

Cone A, constructed in sections $a$ $b$ and deflectors $c$ and $e$, for the purpose and in the manner substantially as described.

D. B. STROPE.

Witnesses:
H. F. WILLSON,
W. S. BUCK.

(94)